US009041739B2

(12) United States Patent
Latta et al.

(10) Patent No.: US 9,041,739 B2
(45) Date of Patent: May 26, 2015

(54) MATCHING PHYSICAL LOCATIONS FOR SHARED VIRTUAL EXPERIENCE (75) Inventors: Stephen Latta, Seattle, WA (US); Kevin Geisner, Mercer Island, WA (US); Brian Mount, Seattle, WA (US); Daniel McCulloch, Kirkland, WA (US); Cameron Brown, Redmond, WA (US); Jeffrey Alan Kohler, Redmond, WA (US); Wei Zhang, Redmond, WA (US); Ryan Hastings, Seattle, WA (US); Darren Bennett, Seattle, WA (US); Ian McIntyre, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 364 days.

(21) Appl. No.: 13/362,783

(22) Filed: Jan. 31, 2012

(65) Prior Publication Data
US 2013/0196772 A1 Aug. 1, 2013

(51) Int. Cl.
G09G 5/00 (2006.01)
A63F 13/48 (2014.01)
G06T 19/00 (2011.01)
G06F 17/30 (2006.01)
G06Q 50/00 (2012.01)
G06Q 10/00 (2012.01)

(52) U.S. Cl.
CPC .......... *A63F 13/48* (2014.09); *G06T 19/006* (2013.01); *A63F 2300/8082* (2013.01); *G06F 17/30047* (2013.01); *G06Q 50/01* (2013.01); *G06Q 10/00* (2013.01)

(58) Field of Classification Search
CPC .............. A63F 2300/8082; A63F 2300/205; A63F 2300/5573; A63F 13/12; G06F 17/30047; G06T 19/006

USPC ............................................. 463/42; 345/633
See application file for complete search history.

(56) References Cited

U.S. PATENT DOCUMENTS

| 7,084,887 | B1 * | 8/2006 | Sato et al. ..................... 345/633 |
| 7,610,558 | B2 * | 10/2009 | Morita ......................... 715/757 |
| 8,537,113 | B2 * | 9/2013 | Weising et al. ............... 345/158 |
| 8,547,401 | B2 * | 10/2013 | Mallinson et al. ............ 345/633 |

(Continued)

OTHER PUBLICATIONS

Szalavári, et al., "Collaborative Gaming in Augmented Reality", Retrieved at <<http://citeseerx.ist.psu.edu/viewdoc/download-?doi=10.1.1.43.5896&rep=rep1&type=pdf>>, Proceedings of the ACM symposium on Virtual reality software and technology, Nov. 1998, pp. 195-204.

(Continued)

*Primary Examiner* — Bach Hoang
*Assistant Examiner* — Anh Vo V Nguyen
(74) *Attorney, Agent, or Firm* — Micah Goldsmith; Judy Yee; Micky Minhas (57) ABSTRACT Embodiments for matching participants in a virtual multiplayer entertainment experience are provided. For example, one embodiment provides a method including receiving from each user of a plurality of users a request to join the virtual multiplayer entertainment experience, receiving from each user of the plurality of users information regarding characteristics of a physical space in which each user is located, and matching two or more users of the plurality of users for participation in the virtual multiplayer entertainment experience based on the characteristics of the physical space of each of the two or more users.

15 Claims, 6 Drawing Sheets

(56) References Cited

U.S. PATENT DOCUMENTS

| | | | |
|---|---|---|---|
| 8,660,679 B2* | 2/2014 | Kurabayashi et al. | 700/94 |
| 8,823,697 B2* | 9/2014 | Woo et al. | 345/419 |
| 2002/0105484 A1* | 8/2002 | Navab et al. | 345/8 |
| 2004/0248632 A1* | 12/2004 | French et al. | 463/4 |
| 2005/0168486 A1* | 8/2005 | Sato et al. | 345/633 |
| 2006/0105838 A1 | 5/2006 | Mullen | |
| 2006/0223635 A1* | 10/2006 | Rosenberg | 463/37 |
| 2007/0024644 A1 | 2/2007 | Bailey et al. | |
| 2007/0173325 A1* | 7/2007 | Shaw et al. | 463/42 |
| 2008/0015018 A1* | 1/2008 | Mullen | 463/39 |
| 2008/0242421 A1 | 10/2008 | Geisner et al. | |
| 2009/0104956 A1* | 4/2009 | Kay et al. | 463/7 |
| 2009/0215536 A1* | 8/2009 | Yee et al. | 463/42 |
| 2009/0285484 A1* | 11/2009 | Mallinson et al. | 382/183 |
| 2010/0279776 A1 | 11/2010 | Hall | |
| 2010/0287485 A1 | 11/2010 | Bertolami et al. | |
| 2010/0302143 A1* | 12/2010 | Spivack | 345/157 |
| 2011/0102460 A1* | 5/2011 | Parker | 345/633 |
| 2011/0216060 A1* | 9/2011 | Weising et al. | 345/419 |
| 2011/0298824 A1* | 12/2011 | Lee et al. | 345/633 |
| 2012/0120113 A1* | 5/2012 | Hueso | 345/672 |
| 2012/0122570 A1* | 5/2012 | Baronoff | 463/31 |
| 2012/0263154 A1* | 10/2012 | Blanchflower et al. | 370/338 |
| 2012/0264510 A1* | 10/2012 | Wigdor et al. | 463/31 |
| 2013/0065692 A1* | 3/2013 | Aronzon et al. | 463/42 |
| 2014/0364215 A1* | 12/2014 | Mikhailov et al. | 463/31 |

OTHER PUBLICATIONS

Nagao, et al., "Agent Augmented Community: Human-to-Human and Human-to-Environment Interactions Enhanced by Situation-Aware Personalized Mobile Agents", Retrieved at <<http://citeseerx.ist.psu.edu/viewdoc/download?doi=10.1.1.43.5896&rep=rep1&type=pdf>>, Proceedings of Community Computing and Support Systems, Lecture Notes in Computer Science 1519, May 1, 1998, pp. 342-358.

Ohshima, et al., "AR2Hockey: A Case Study of Collaborative Augmented Reality", Retrieved at <<http://ieeexplore.ieee.org/stamp/stamp.jsp?tp=&arnumber=658505>>, Proceedings of IEEE Virtual Reality Annual International Symposium, Mar. 14-18, 1998, pp. 268-275.

* cited by examiner

MATCHING PHYSICAL LOCATIONS FOR SHARED VIRTUAL EXPERIENCE

BACKGROUND

Multi-participant digital experiences may take many forms. For example, some video games, such as massively multiplayer online games (MMOGs) may allow users in many different locations to participate in a shared experience in which each user assumes different roles in the game.

Other multiplayer virtual reality experiences, such as augmented reality experiences, may allow users to join together in a mixed reality environment. As these virtual reality environments may be based on a pre-configured virtual environment, such experiences may be limited to users in a same physical location that is complementary to the virtual environment.

SUMMARY

Embodiments related to matching participants in a virtual reality environment based upon characteristics of a physical environment of each participant are presented. In one example, a method for matching participants in a virtual multiplayer entertainment experience comprises receiving from each user of a plurality of users a request to join the virtual multiplayer entertainment experience, and receiving from each user of the plurality of users information regarding characteristics of a physical space in which each user is located. The method also comprises matching two or more users of the plurality of users for participation in the virtual multiplayer entertainment experience based on the characteristics of the physical space of each of the two or more users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Augmented reality systems may allow users to participate in virtual multiplayer entertainment experiences, such as games. However, as mentioned above, such experiences may utilize a pre-set map. As such, users may be limited to participating in such experiences in preset locations rather than a location of the users' choosing. Further, this may limit users to be located within the same physical location, rather than different locations. Thus, embodiments are disclosed herein that facilitate the dynamic creation of virtual environments and matching of users in different physical locations for participation in a shared augmented reality experience. To match such users, characteristics of each user's physical space may be determined, and users having similar physical spaces may be matched in the same virtual multiplayer entertainment experience utilizing a virtual reality environment based on attributes of each physical space.

The characteristics of each physical space may be determined based on sensor input received on a sensor system, such as a head-mounted display (HMD) device, of each user. Each user's HMD device may send to a network-accessible matching service information regarding the characteristics of a respective physical space in which the HMD device is located. Other information also may be sent, such as the particular virtual experience each user wishes to join, and/or the geographic location of each user. Based on such information, the matching service may match users having similar physical spaces, and negotiate a shared virtual reality environment so that users in different physical locations can join the same virtual multiplayer entertainment experience.

Figure 1A:
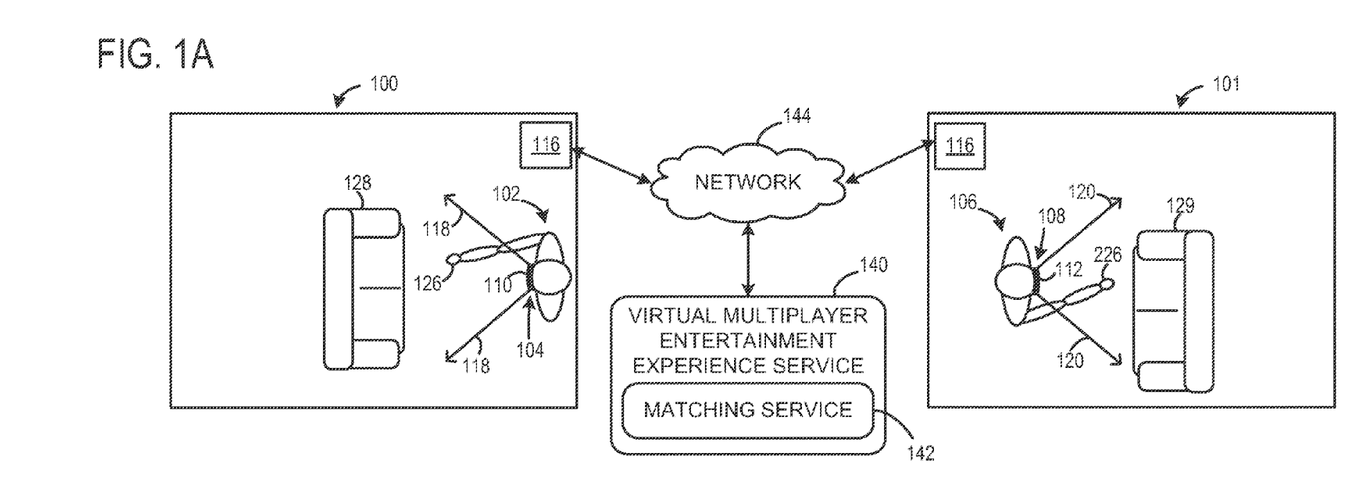
FIG. 1A schematically shows top views of example physical spaces according to an embodiment of the present disclosure.

FIG. 1A shows an example first physical space 100 and an example second physical space 101. Physical space 100 may be in a different physical location than physical space 101. Physical space 100 and physical space 101 include similar characteristics. For example, the depicted physical spaces 100 and 101 are rooms of similar size and dimension. Further, both physical space 100 and physical space 101 include a real object of similar size and shape, such as an item of furniture.

As shown in FIG. 1A, a user 102 wearing HMD device 104 including a see-through display 110 occupies physical space 100. HMD device 104 observes physical space 100 from a perspective as outlined by arrows 118. One or more images of such a perspective may be provided as input to execute a shared virtual reality environment, an example of which is shown at 114 of FIG. 1B. Further, see-through display 110 may be configured to visually augment an appearance of physical space 100 to user 102. In other words, see-through display 110 allows light from physical space 100 to pass through see-through display 110 so that user 102 can directly see the actual physical space 100, as opposed to seeing an image of the physical space on a conventional display device. Furthermore, see-through display 110 is configured to generate light and/or modulate light so as to display one or more virtual objects as an overlay to the actual physical space 100. In this way, see-through display 110 may be configured so that user 102 is able to view a real object in physical space through one or more partially transparent pixels that are displaying a virtual object.

FIG. 1A also schematically shows a computing system 116 in physical space 100. Computing system 116 may be used to play a variety of different games, play one or more different media types, and/or control or manipulate non-game applications and/or operating systems. Computing system 116 may wirelessly communicate with HMD devices to present game or other visuals to users. It will be understood that computing system 116 may be omitted in some embodiments.

Computing system 116 (where present) and/or HMD devices 104 and 108 may communicate with a virtual multiplayer entertainment experience service 140 via a network 144. The virtual multiplayer entertainment experience service 140 may provide information regarding virtual entertainment experiences to the computing system 116 and/or HMD devices 104 and 108, and may include a matching service 142 to match two or more participants in a virtual entertainment experience, as explained below with respect to FIG. 3.

Also shown in FIG. 1A, a user 106 wearing HMD device 108, which includes see-through display 112, occupies physical space 101. HMD device 108 observes physical space 101 from a perspective as outlined by arrows 120. Such a perspective may also be provided as input to execute the virtual reality environment 114 of FIG. 1B. HMD device 108 may include a second see-through display 112 configured to display the shared virtual reality environment to user 106. Similar to see-through display 110, see-through display 112 may be configured to visually augment the appearance of physical space 101 to user 106. Physical space 101 also includes computing system 116 configured to communicate with virtual multiplayer entertainment experience service 140 via the network 144. As mentioned above, such a separate computing system 116 may be omitted in some embodiments, and the HMD device 108 may communicate directly with service 140.

Further, one or more tracking systems may monitor a position and/or orientation of HMD device 104 and HMD device 108 within physical spaces 100 and 101. The tracking system may be integral with each HMD device, and/or the tracking system may be a separate system, such as a component of computing system 116. A separate tracking system may track each HMD device by capturing images that include at least a portion of the HMD device and a portion of the surrounding physical space, for example. Further, such a tracking system may provide input to a three-dimensional (3D) modeling system.

Figure 1B:
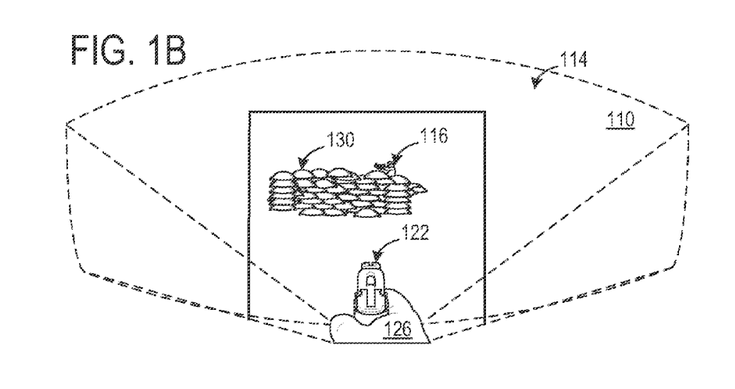
FIG. 1B shows a perspective view of an example shared virtual reality environment based on the physical spaces of FIG. 1A.

The 3D modeling system may build a 3D virtual reality environment based on at least one physical space, such as physical space 100, physical space 101, or a separate physical space. The 3D modeling system may be integral with each HMD device, and/or the 3D modeling system may be a separate system, such as a component of computing system 116. The 3D modeling system may receive a plurality of images from the tracking system, which may be compiled to generate a 3D map of physical space 100, for example. Once the 3D map is generated, the tracking system may track the HMD devices with improved precision. In this way, the tracking system and the 3D modeling system may cooperate synergistically. The combination of position tracking and 3D modeling is often referred to as simultaneous localization and mapping (SLAM) to those skilled in the art. For example, SLAM may be used to build a shared virtual reality environment 114.

Referring to FIG. 1B, shared virtual reality environment 114 may be a virtual world that incorporates and/or builds off of one or more aspects observed by HMD device 104 and one or more aspects observed by HMD device 108. Thus, shared virtual reality environment 114 may be formed via a shared coordinate system that maps a coordinate system from the perspective of user 102 with a coordinate system from the perspective of user 106. For example, HMD device 104 may be configured to display shared virtual reality environment 114 by transforming a coordinate system of physical space 100 from the perspective of see-through display 110 to a coordinate system of physical space 101 from the perspective of see-through display 112. Likewise, HMD device 108 may be configured to display shared virtual reality environment 114 by transforming the coordinate system of physical space 101 from the perspective of see-through display 112 to the coordinate system of physical space 100 from the perspective of see-through display 110. It is to be understood that the native coordinate system of any HMD device may be mapped to the native coordinate system of another HMD device, or the native coordinate system of all HMD devices may be mapped to a neutral coordinate system.

As another example, shared virtual reality environment 114 may be formed from a previously mapped physical environment. For example, one or more maps may be stored such that the HMD device may access a particular stored map that is similar to a particular physical space. For example, one or more features of the particular physical space may be used to match the particular physical space to a stored map. Further, it will be appreciated that such a stored map may be augmented, and as such, the stored map may be used as a foundation from which to generate a 3D map for a current session. As such, real-time observations may be used to augment the stored map based on the perspective of a user wearing the HMD device, for example.

In this way, one or more virtual objects and/or one or more real objects may be mapped to a position within the shared virtual reality environment 114 based on the shared coordinate system. Therefore, users 102 and 106 may move within the shared virtual reality environment, and thus change perspectives, and a position of each object (virtual and/or real) may be shared to maintain the appropriate perspective for each user.

FIG. 1B shows a perspective view of shared virtual reality environment 114 as seen through see-through display 110. As shown, real hand 126 interacts with virtual object 122, which is illustrated in FIG. 1B as a handgun by way of example.

Turning back to FIG. 1A, physical space 100 includes a real object 128, and further, physical space 101 also includes a real object 129. Therefore, real objects 128, 129 are physically present within physical space 100 and physical space 101. As shown, real objects 128, 129 are both couches, but may take any suitable form.

Referring again to FIG. 1B, both real object 128 and real object 129 are incorporated into shared virtual reality environment 114 as a surface reconstructed object 130. Therefore, real objects 128, 129 are transformed to surface reconstructed object 130, which is an example of a virtual object. In particular, a shape of real object 128, 129 is used to render a similar shaped surface reconstructed object 130. As shown, surface reconstructed object 130 is a pile of sandbags.

While not shown in FIG. 1B, a perspective view of surface reconstructed object 130 may be different between see-through display 110 and see-through display 112. In other words, each user may see a different side of surface reconstructed object 130, depending upon each user's perspective and distance from the real object 128, 129 located in each respective physical space.

FIGS. 1A-1B show a combat virtual reality game as an example to illustrate a general concept. Other games, and non-game applications are possible without departing from the scope of this disclosure. Further, it is to be understood that physical spaces 100 and 101 and corresponding shared virtual reality environment 114 may include additional and/or alternative features than those shown in FIGS. 1A-1B. For example, physical space 100 and/or physical space 101 may optionally include one or more playspace cameras. Further, the physical spaces are not limited to the rooms illustrated in FIG. 1A. For example, each physical space may be another indoor space, an outdoor space, or virtually any other space.

It will be appreciated that FIGS. 1A-1B are provided by way of example, and thus are not meant to be limiting. Further, it is to be understood that some features may be omitted from the illustrative embodiment without departing from the scope of this disclosure. For example, computing system 116 may be omitted, and first and second HMD devices may be configured to leverage the shared coordinate system to build the shared virtual reality environment without computing system 116.

Figure 2A:
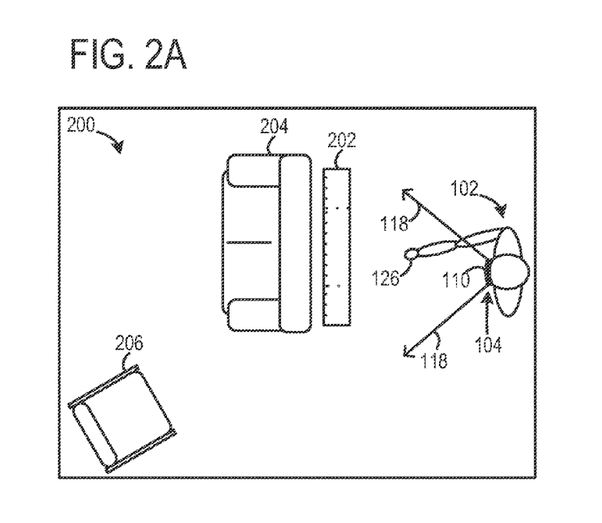
FIGS. 2A and 2B schematically show top views of example physical spaces according to another embodiment of the present disclosure.
Figure 2B:
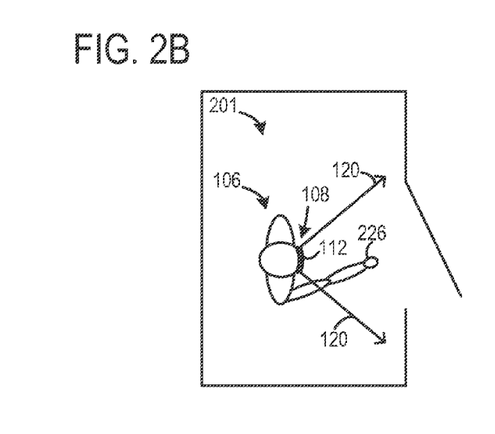
Figure 2C:
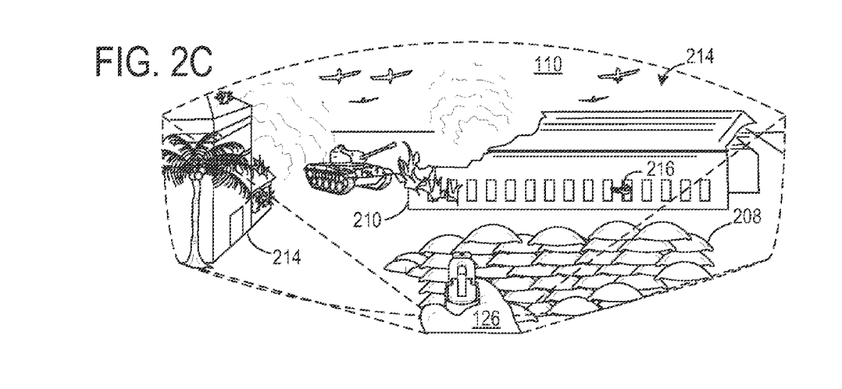
FIG. 2C shows a perspective view of an example shared virtual reality environment based on the physical spaces of FIGS. 2A and 2B.

Turning to FIGS. 2A-2C, physical spaces and a shared virtual reality environment according to another embodiment of the present disclosure are depicted. Physical space 200 of FIG. 2A and physical space 201 of FIG. 2B are located in different physical locations. Similar to FIGS. 1A and 1B, physical space 200 and physical space 201 include user 102 and HMD devices 104, and user 106 and HMD device 108, respectively, as well as other components discussed with respect to FIGS. 1A and 1B. Physical space 200 is of a larger dimension than physical space 201, and includes real objects not included in physical space 201, such as real object 202, herein depicted as a table; real object 204, depicted as a couch; and real object 206, depicted as a chair.

As physical space 200 and physical space 201 do not share similar characteristics, instead of being matched with a single common space in a virtual reality environment, the characteristics of each physical space may be matched with corresponding complementary, but different, spaces of a virtual reality environment. Shared virtual reality environment 214 is depicted in FIG. 2C through the perspective of see-through display 110 of user 102. The real objects of physical space 200 are represented by surface reconstructed objects 208, 210, and 212. Because physical space 201 does not include any real objects and is a smaller space than physical space 200, user 106 may be matched to a specific area of virtual reality environment 214, in this example a room within surface reconstructed object 210. As such, user 106 is depicted as a player 216 within virtual reality environment 214 from the perspective of user 102. Likewise, user 106 may have the perspective of being in the room and looking out at a character representing user 102.

In another embodiment, if users are located in physical spaces having different sizes or other characteristics, a user in a physical space that closely matches the size criteria of a particular virtual entertainment experience may be chosen as the main, default physical space. Then other users located in physical spaces that do not match may have their virtual environments adapted to match the characteristics of the main physical location. For example, in the example virtual reality environment 214, physical space 200 may be selected as the main physical space due to characteristics of the physical space 200 matching size criteria of a chosen virtual multiplayer entertainment experience. User 106 in physical space 201 may then have his or her virtual reality environment adapted to match the virtual reality environment 214.

Figure 3:
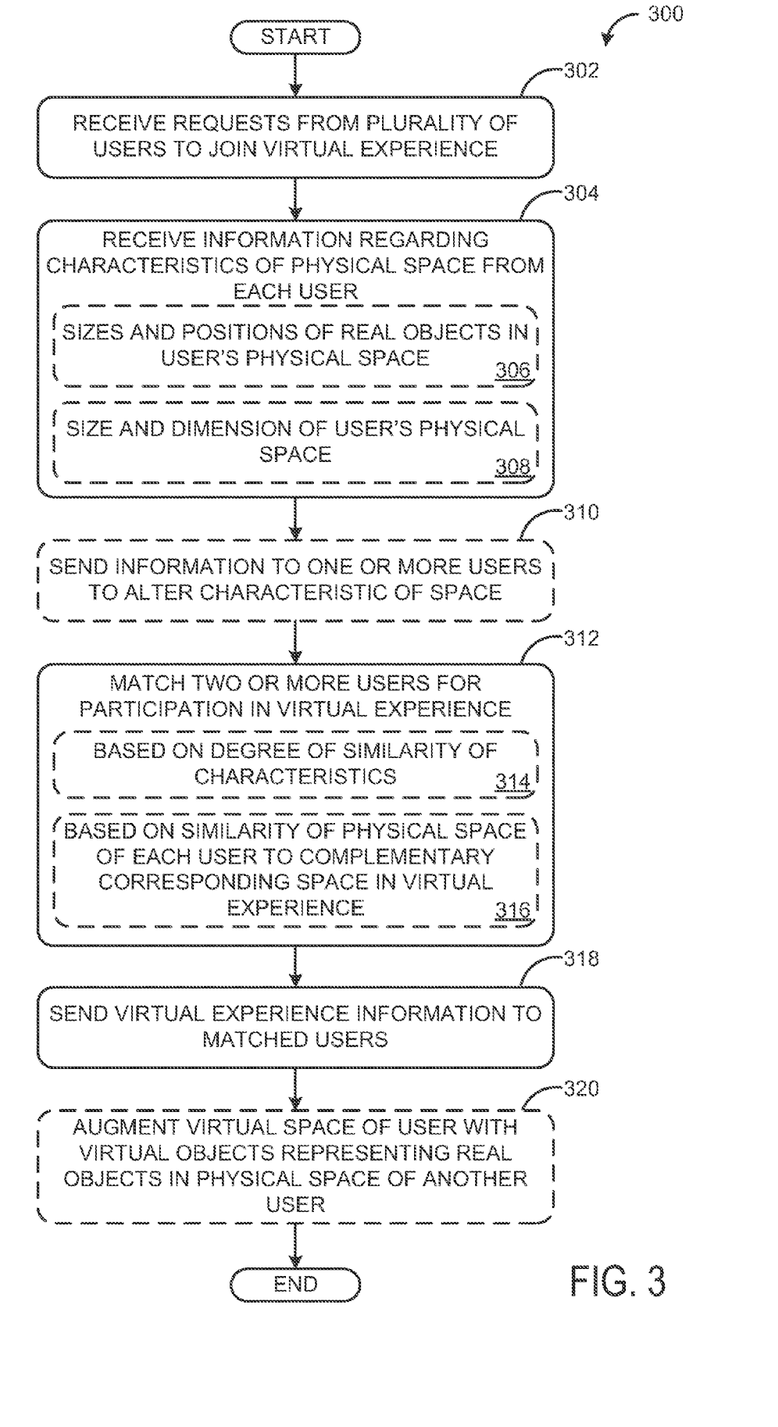
FIG. 3 shows a flow chart illustrating an example method for matching participants in virtual multiplayer entertainment experience according to an embodiment of the present disclosure.

Turning to FIG. 3, an example method 300 for matching participants in a virtual multiplayer entertainment experience is depicted. It will be understood that method 300 may be carried out by one or more computing systems configured to operate a virtual multiplayer entertainment experience service, in communication with a plurality of user computing devices (e.g., HMD devices or other suitable devices). At 302, method 300 includes receiving a request from each user of a plurality of users to join a virtual multiplayer entertainment experience. Method 300 also includes, at 304, receiving from each user of the plurality of users information regarding characteristics of a physical space in which each user is located. As explained above, each user of the plurality of users may have a computing device, such as a HMD device, that comprises one or more sensors that are configured to obtain information regarding the characteristics of the physical space in which that HMD device is located. For example, the HMD devices may include outward-facing depth cameras, visible light cameras, infrared cameras, etc., which may be used to determine various attributes of the physical space. This information may be sent from each HMD device along with or separate from the request to join the virtual experience.

The characteristics of the physical space of each user may include the sizes and positions of real objects in that user's physical space at 306. The characteristics may also include the size and dimension of that user's physical space at 308. The location of the physical space of each user may also be determined based on information from a location service, for example, or from a GPS unit on each HMD device. Additionally, the proximity of other users may be included in the characteristics of the physical space. In some embodiments, users located within or near the same physical space may preferentially be matched over users located in physical locations spaced far apart from each other. Other characteristics of each user's physical space, such as the amount of ambient light, the number of transient objects moving through the physical space, etc., are also within the scope this disclosure.

The information regarding the characteristics of the physical space of each user may be used to match users that are located in different physical spaces with similar characteristics. For example, a user that is located in a living room with a large couch and a coffee table may be matched with other users also located in rooms including couches and tables, but not with users that are located in an empty parking lot. Further, in some embodiments, the overall size and dimension of the physical spaces among users may not be similar, but users may be matched based on specific real objects in each user's physical space. For example, each user may be in a kitchen that includes a specific utensil, such as a wok, and each user may request to join a virtually cooking experience that involves using a wok. Even if the size and dimension of each kitchen of each user may be different, the users may be matched due to each having a wok in his or her physical space.

In some instances, a user may be located in a physical space that does not have enough similar characteristics with any other users' physical spaces to constitute a match. In such circumstances, the user may be able to alter one or more characteristics of his or her physical space to match another user's physical space. As such, method 300 may include, at 310, sending information to one or more users to alter one or more characteristics of the user's physical space. In some embodiments, sending information to alter a characteristic of the physical space may include instructing the user to move one or more real objects within that user's physical space. In other embodiments, altering characteristics of the user's physical space may include instructing the user to move to an entirely different physical location. If the location of the user and information on other nearby locations (e.g. other rooms in the user's residence) is known, the user may be instructed to move to such a location that better matches another player's physical space. Further, if other users are located nearby, the instructions may lead the user to the location in which the other users are located, to facilitate a shared environment.

At 312, method 300 includes matching two or more users for participation in a virtual multiplayer entertainment experience. As explained previously, this matching may be based on the characteristics of the physical spaces in which each is located. For example, the matching may be performed based on a degree of similarity of the characteristics of the physical spaces in which each user is located, as indicated at 314. The degree of similarity may be determined in any suitable manner. For example, each user's HMD device may send depth images of the physical location in which it is located, and/or may extract dimensional information from depth images. The depth images and/or dimensional information extracted from the depth images may be compared by a matching service for matching. It will be understood that any suitable mechanism for determining similarity between physical spaces is within the scope of this disclosure.

In some embodiments, as described above with reference to FIGS. 2A-2C, rather than matching users with similar physical spaces, users may be matched based on a similarity of the user's physical space to a particular virtual space within a virtual reality environment. For example, if one user is located in his or her backyard while another user is located in a small bedroom, rather than instruct the users to alter their physical locations, the users may be matched with a virtual environment that provides spaces complementary to each physical environment. In one example, this may include placing the user located in the backyard in a virtual open battlefield, and placing the user located in the bedroom in a virtual lookout tower at the edge of the battlefield. In this way, the virtual environment in which each user is located may still be defined by the constraints of the physical space in which each user is located. Thus, matching users may include, at 316, matching users based on a similarity of the physical space of each user to a complementary corresponding space in the virtual multiplayer entertainment experience.

Upon matching two or more users, method 300 includes, at 318, sending virtual experience information to the matched users. This information may allow the matched users to join the virtual experience, and may include an invitation to join the experience, information regarding other users also joining the experience, etc.

Further, in some embodiments, if the physical space of a user doesn't have a high degree of similarity to another user's physical space, the virtual space of one or more users may be augmented to match the physical space of one or more other users. Thus, at 320, method 300 may include augmenting a virtual space of one the two or more users with virtual objects that represent real objects in the physical space of another of the two or more users. For example, if the physical space of a first user includes a large empty room and the physical space of a second user includes a small room with a closet, the virtual space presented to the first user may be augmented with virtual walls that represent the real walls in the physical space of the second user.

Thus, method 300 provides for matching two or more users for participation in a virtual multiplayer entertainment experience based on constraints of each user's physical space. In some embodiments, each user may specify a particular virtual entertainment experience he or she wishes to join, and may be matched with other users also wishing to join that entertainment experience that have similar physical space characteristics. In such embodiments, the virtual entertainment experience may have some predefined attributes that are scaled based on the characteristics of the matching users' physical spaces. For example, the size of the virtual experience space may be altered, and/or the size, shape, and position of virtual objects within the space may be altered to match the physical spaces of the users. In other examples, the users may be placed into particular spaces within the virtual environment of the entertainment experience that are complementary to the characteristics of the user's physical space.

In other embodiments, the users may not specify a particular virtual entertainment experience they wish to join, but instead may be matched with a virtual entertainment experience that best fits various attributes of that user and his or her physical space. For example, the characteristics of the user's physical space may be matched to a virtual entertainment experience that includes similar characteristics. In addition, the capabilities of the HMD device of the user may be considered, as well as the skill level of the user, other players located near the user, etc. In this way, an optimal virtual entertainment experience may be chosen for each user.

Figure 4:
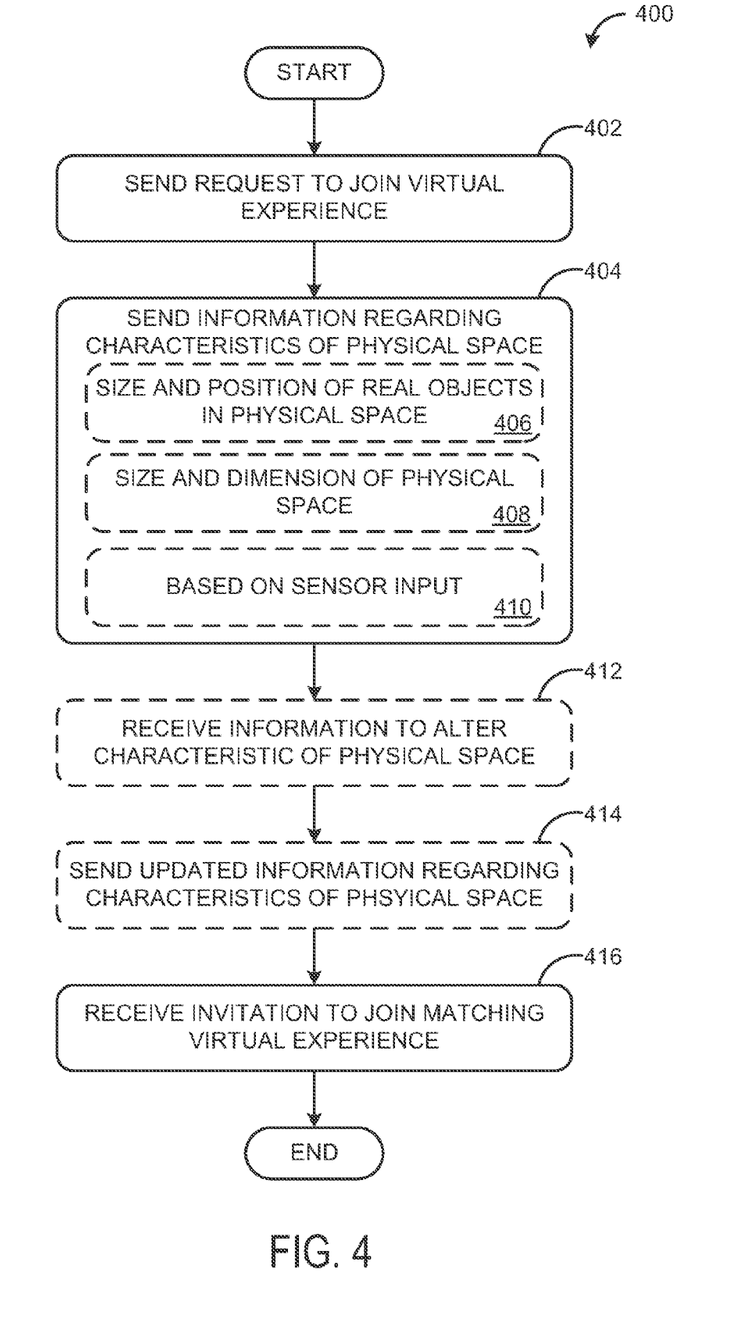
FIG. 4 shows a flow chart illustrating an example method for matching participants in virtual multiplayer entertainment experience according to another embodiment of the present disclosure.

FIG. 4 illustrates an example method 400 for matching participants in a virtual multiplayer entertainment experience according to another embodiment of the present disclosure. Method 400 may be carried out by a portable see-through display device of a user, such as HMD device 104, or any other suitable device. Method 400 includes, at 402, sending a request to join a virtual multiplayer entertainment experience. The request may be sent, for example, to a network-accessible virtual multiplayer entertainment experience service and/or matching service in communication with the user's device. The matching service may be configured to match the user with one or more other users based on characteristics of each user's physical space. The request may include a request to join a particular virtual multiplayer entertainment experience, or may include a request to join any virtual multiplayer entertainment experience that matches attributes of the user and the user's physical space.

The request may be made by the user in any suitable manner. In one example, the request may include a user voice command detected by a sensor of the user's device. In another example, the request may include a user input to an input device such as a keyboard, game controller, etc.

At 404, method 400 includes sending information regarding characteristics of the physical space in which the user's device is located from the user's device to the remote service for matching. The characteristics may include sizes and positions of real objects in the physical space at 406 and the size and dimension of the physical space at 408. These characteristics may be based on sensor input at 410, from one or more sensors coupled to the user's device. Example sensor input includes depth images, audio input, etc. Further, additional information regarding the user's physical space may be sent, such as location information from a GPS unit.

If the user's physical space does not have a high enough degree of similarity to match a particular virtual entertainment experience and/or another user, method 400 may include receiving information from the service instructing the user to alter one or more characteristics of his or her physical space at 412. If the user receives instructions to alter the physical space, upon altering the physical space, the user's device may send updated information regarding characteristics of the physical space to the service at 414.

At 416, method 400 includes receiving an invitation to join a matching virtual multiplayer experience. The invitation may include virtually any information that may be used by the user's device to join the virtual experience. Upon receiving an invitation, method 400 ends.

Thus, method 400 provides for matching a user to a virtual multiplayer entertainment experience, based on characteristics of the user's physical space. In some embodiments, the user may be matched to more than one virtual experience. In such circumstances, the user may receive multiple invitations, and may choose which virtual experience to join.

Figure 5A:
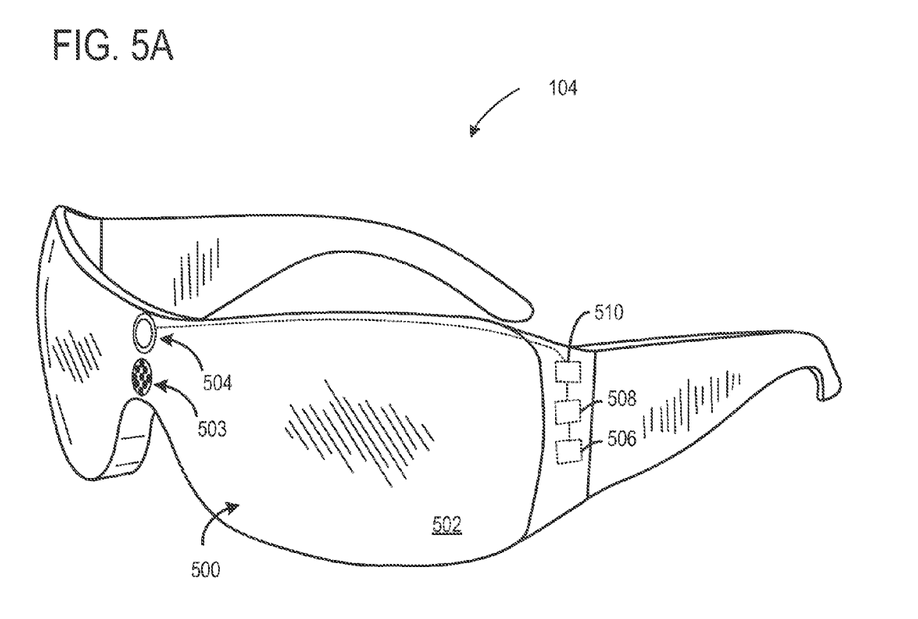
FIG. 5A shows an example head mounted display according to an embodiment of the present disclosure.
Figure 5B:
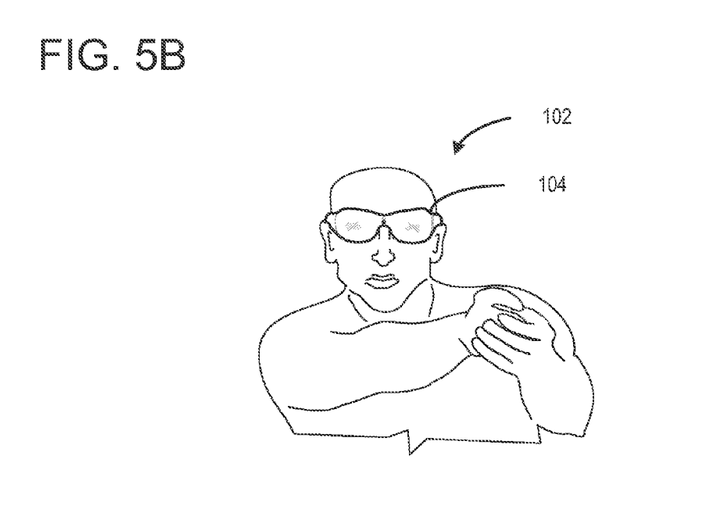
FIG. 5B shows a user wearing the example head mounted display of FIG. 5A.

FIG. 5A shows an example embodiment of HMD device 104 (and HMD device 108). The HMD device 104 takes the form of a pair of wearable glasses, as shown. For example, FIG. 5B shows a user, such as first user 102 or second user 106, wearing the HMD device. In some embodiments, the HMD device may have another suitable form in which a see-through display system is supported in front of a viewer's eye or eyes.

The HMD device includes various sensors and output devices. For example, as shown, the HMD device includes a see-through display subsystem 500 configured to deliver images to the eyes of a user. As one nonlimiting example, the display subsystem 500 may include image-producing elements (e.g. see-through OLED displays) located within lenses 502. As another example, the display subsystem may include a light modulator on an edge of the lenses, and the lenses may serve as a light guide for delivering light from the light modulator to the eyes of a user. Because the lenses 502 are at least partially transparent, light may pass through the lenses to the eyes of a user, thus allowing the user to see through the lenses.

The HMD device 104 also includes one or more image sensors. For example, the HMD device may include at least one inward facing sensor 503 and/or at least one outward facing sensor 504. Inward facing sensor 503 may be an eye tracking image sensor configured to acquire image data to allow a viewer's eyes to be tracked.

Outward facing sensor 504 may detect gesture-based user inputs. For example, outwardly facing sensor 504 may include a depth camera, a visible light camera, an infrared light camera, and/or another position tracking camera. Further, such outwardly facing cameras may have a stereo configuration. For example, the HMD device may include two depth cameras to observe the physical space in stereo from two different angles of the user's perspective. In some embodiments, gesture-based user inputs also may be detected via one or more playspace cameras, while in other embodiments gesture-based inputs may not be utilized. Further, outward facing image sensor 504 may capture images of a physical space, which may be provided as input to a 3D modeling system.

As described above, such a system may be used to generate a 3D model of the physical space. In some embodiments, the HMD device may include an infrared projector to assist in structured light and/or time of flight depth analysis. For example, the HMD device may include more than one sensor system to generate the 3D model of the physical space. In some embodiments, the HMD device may include depth sensing via a depth camera as well as light imaging via an image sensor that includes visible light and/or infrared light imaging capabilities.

The HMD device 104 also may include one or more motion sensors 508 to detect movements of a viewer's head when the viewer is wearing the HMD device. Motion sensors 508 may output motion data for provision to computing system 116 for tracking viewer head motion and eye orientation, for example. As such motion data may facilitate detection of tilts of the user's head along roll, pitch and/or yaw axes, such data also may be referred to as orientation data. Further, motion sensors 508 may enable position tracking of the HMD device to determine a position of the HMD device within a physical space. Likewise, motion sensors 508 may also be employed as user input devices, such that a user may interact with the HMD device via gestures of the neck and head, or even of the body. Non-limiting examples of motion sensors include an accelerometer, a gyroscope, a compass, and an orientation sensor, which may be included as any combination or sub- combination thereof. Further, the HMD device may be configured with global positioning system (GPS) capabilities. The HMD device may also include one or more microphones 506 to allow the use of voice commands as user inputs. Additionally or alternatively, one or more microphones separate from the HMD device may be used to detect viewer voice commands. It will be understood that the sensors illustrated in FIG. 5A are shown by way of example and thus are not intended to be limiting in any manner, as any other suitable sensors and/or combination of sensors may be utilized.

The HMD device further includes a controller 510 having a logic subsystem and a data-holding subsystem in communication with the various input and output devices of the HMD device, examples of which are discussed in more detail below with respect to FIG. 6. Briefly, the data-holding subsystem may include instructions that are executable by the logic subsystem, for example, to receive and forward inputs from the sensors to computing system 116 (in unprocessed or processed form) via a communications subsystem, and to present such images to the viewer via the see-through display subsystem 500. Audio may be presented via one or more speakers on the HMD device, or via another audio output within the physical space.

It will be appreciated that the HMD device is provided by way of example, and thus is not meant to be limiting. Therefore it is to be understood that the HMD device may include additional and/or alternative sensors, cameras, microphones, input devices, output devices, etc. than those shown without departing from the scope of this disclosure. Further, the physical configuration of an HMD device and its various sensors and subcomponents may take a variety of different forms without departing from the scope of this disclosure.

In some embodiments, the above described methods and processes may be tied to a computing system including one or more computers. In particular, the methods and processes described herein may be implemented as a computer application, computer service, computer API, computer library, and/or other computer program product.

Figure 6:
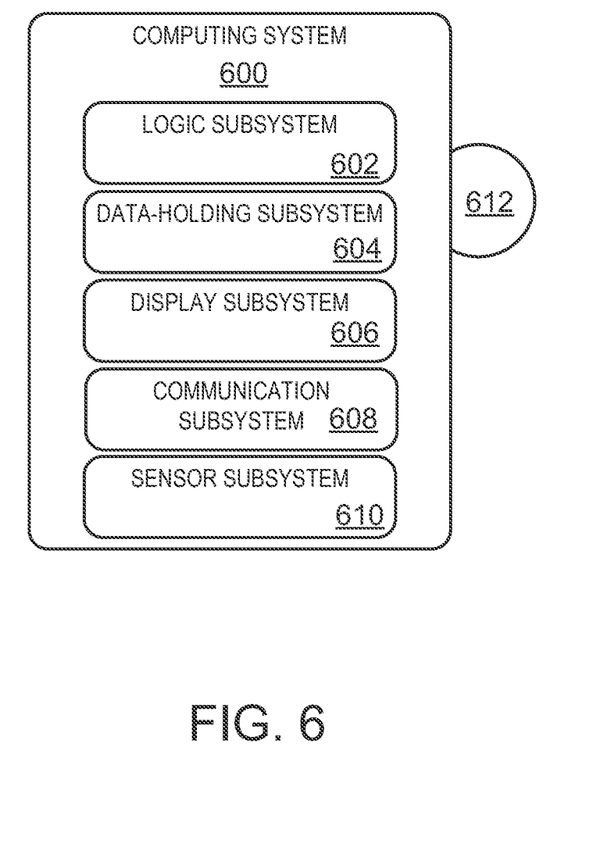
FIG. 6 schematically shows an example computing system according to an embodiment of the present disclosure.

FIG. 6 schematically shows a nonlimiting computing system 600 that may perform one or more of the above described methods and processes. Computing system 600 may represent HMD devices 104 and 108, a computing system 116 separate from HMD devices 104 and 108 but communicatively coupled to each HMD device, a network-accessible computing system configured to operate a virtual multiplayer entertainment experience service, such as virtual multiplayer entertainment experience service 140, and/or any other suitable computing system. Computing system 600 is shown in simplified form. It is to be understood that virtually any computer architecture may be used without departing from the scope of this disclosure. In different embodiments, computing system 600 may take the form of a mainframe computer, server computer, desktop computer, laptop computer, tablet computer, home entertainment computer, network computing device, mobile computing device, mobile communication device, gaming device, head-mounted display device, etc.

Computing system 600 includes a logic subsystem 602 and a data-holding subsystem 604. Computing system 600 may optionally include a display subsystem 606, communication subsystem 608, and/or other components not shown in FIG. 6. Computing system 600 may also optionally include user input devices such as keyboards, mice, game controllers, cameras, microphones, and/or touch screens, for example.

Logic subsystem 602 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 604 may include one or more physical, non-transitory, devices configured to hold data and/or instructions executable by the logic subsystem to implement the herein described methods and processes. When such methods and processes are implemented, the state of data-holding subsystem 604 may be transformed (e.g., to hold different data).

Data-holding subsystem 604 may include removable media and/or built-in devices. Data-holding subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 604 may include devices with one or more of the following characteristics: volatile, nonvolatile, dynamic, static, read/write, read-only, random access, sequential access, location addressable, file addressable, and content addressable. In some embodiments, logic subsystem 602 and data-holding subsystem 604 may be integrated into one or more common devices, such as an application specific integrated circuit or a system on a chip.

FIG. 6 also shows an aspect of the data-holding subsystem in the form of removable computer-readable storage media 612, which may be used to store and/or transfer data and/or instructions executable to implement the herein described methods and processes. Removable computer-readable storage media 612 may take the form of CDs, DVDs, HD-DVDs, Blu-Ray Discs, EEPROMs, and/or floppy disks, among others.

It is to be appreciated that data-holding subsystem 604 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

It is to be appreciated that a "service", as used herein, may be an application program executable across multiple user sessions and available to one or more system components, programs, and/or other services. In some implementations, a service may run on a server responsive to a request from a client.

When included, display subsystem 606 may be used to present a visual representation of data held by data-holding subsystem 604. For example, display subsystem 606 may be a see-through display, as described above. As the herein described methods and processes change the data held by the data-holding subsystem, and thus transform the state of the data-holding subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or data-holding subsystem 604 in a shared enclosure, or such display devices may be peripheral display devices.

When included, communication subsystem 608 may be configured to communicatively couple computing system 600 with one or more other computing devices. For example, communication subsystem 608 may be configured to communicatively couple computing system 600 to one or more other HMD devices, a gaming console, or another device. Communication subsystem 608 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 600 to send and/or receive messages to and/or from other devices via a network such as the Internet.

Sensor subsystem 610 may include one or more sensors configured to sense different physical phenomenon (e.g., visible light, infrared light, acceleration, orientation, position, etc.), as described above. For example, the sensor subsystem 610 may comprise one or more image sensors, motion sensors such as accelerometers, touch pads, touch screens, and/or any other suitable sensors. Therefore, sensor subsystem 610 may be configured to provide observation information to logic subsystem 602, for example. As described above, observation information such as image data, motion sensor data, and/or any other suitable sensor data may be used to perform such tasks as determining a particular gesture performed by the one or more human subjects.

In some embodiments, sensor subsystem 610 may include a depth camera (e.g., outward facing sensor 504 of FIG. 5A). The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots). The depth camera may be configured to image the structured illumination reflected from a scene onto which the structured illumination is projected. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, sensor subsystem 610 may include a visible light camera. Virtually any type of digital camera technology may be used without departing from the scope of this disclosure. As a non-limiting example, the visible light camera may include a charge coupled device image sensor.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer-implemented method for matching participants in a virtual multiplayer entertainment experience, the method comprising:
   receiving, at a virtual multiplayer entertainment experience service, from a computing device of each user of a plurality of users a request to join the virtual multiplayer entertainment experience;
   receiving, at the virtual multiplayer entertainment experience service, from the computing device of each user of the plurality of users information regarding characteristics of a layout of a physical space in which each user is located, the information including dimensional information for the physical space, the dimensional information comprising information regarding a size and dimension of each user's physical space;
   comparing, at the virtual multiplayer entertainment experience service, the size and dimension of the physical space of each of the plurality of users; and
   matching, via the virtual multiplayer entertainment experience service, two or more users of the plurality of users for participation in the virtual multiplayer entertainment experience based at least in part on the comparing of the size and dimension of the physical space of each of the two or more users.

2. The method of claim 1, further comprising sending, from the computing device, additional instructions to at least one of the two or more users to alter one or more characteristics of that user's physical space.

3. The method of claim 2, wherein sending additional instructions to at least one of the two or more users to alter one or more characteristics of that user's physical space further comprises sending instructions to at least one of the two or more users to move to a different physical space.

4. The method of claim 1, wherein each of the plurality of users are located in different physical spaces, and wherein matching two or more users of the plurality of users further comprises matching two or more users based on a degree of similarity of characteristics of the layout of the physical spaces of the users.

5. The method of claim 1, wherein each of the plurality of users are located in different physical spaces, and wherein matching two or more users of the plurality of users further comprises matching two or more users based on a similarity of the layout of the physical space of each user to a complementary corresponding space in the virtual multiplayer entertainment experience.

6. The method of claim 1, wherein receiving from each of the plurality of users information regarding characteristics of the layout of the physical space in which each user is located further comprises receiving information regarding sizes and positions of real objects within each user's physical space, and wherein matching two or more users of the plurality of users for participation in the virtual multiplayer entertainment experience based on the characteristics of the layout of the physical space of each of the two or more users further comprises matching two or more users of the plurality of users for participation in the virtual multiplayer entertainment experience based on the sizes and positions of real objects within each user's physical space.

7. A portable see-through display device, comprising:
   one or more image sensors to obtain information regarding characteristics of the layout of the physical space in which a user is located;
   a logic subsystem; and
   a data-holding subsystem holding instructions executable by the logic subsystem to:
      send a request to a virtual multiplayer entertainment experience service to join a matching virtual multiplayer entertainment experience;
      send to the virtual multiplayer entertainment experience service information regarding characteristics of a layout of a physical space in which the portable see-through device is located, the information including dimensional information for the physical space; and
      receive matching information selected at least in part based on the dimensional information, the matching information usable to join the matching virtual multiplayer entertainment experience,
      wherein the dimensional information includes a size and dimension of the user's physical space.

8. The portable see-through display device of claim 7, wherein the image sensors comprise one or more of depth sensors, visible light cameras, and infrared light cameras.

9. The portable see-through display device of claim 7, wherein the instructions are further executable to receive information instructing the user to alter one or more of the characteristics of the physical space in which the user is located, and to send updated information regarding characteristics of the physical space in which the portable see-through device is located.

10. The portable see-through display device of claim 7, wherein the information regarding characteristics of the layout of the physical space in which the user is located includes a size and position of objects within the user's physical space.

11. A computing system, comprising:
   a logic subsystem; and
   a data-holding subsystem holding instructions executable by the logic subsystem to:
      receive from a computing device of each user of a plurality of users a request to join a virtual multiplayer entertainment experience;
      receive from the computing device of each user of the plurality of users information regarding characteristics of a layout of a physical space in which each user is located;
      match two or more users of the plurality of users for participation in the virtual multiplayer entertainment experience based on the characteristics of the layout of the physical space of each of the two or more users, the two or more users matched based on a similarity of the layout of the physical space of each user to a respective different complementary corresponding space in the virtual multiplayer entertainment experience, wherein the information regarding characteristics of the layout of the physical space in which each user is located comprises information regarding a size and dimension of each user's physical space; and augment a virtual space of one of the two or more users with virtual objects that represent real objects in the physical space of another of the two or more users.

12. The computing device of claim 11, wherein the instructions are further executable to send additional instructions to at least one of the two or more users to alter one or more characteristics of that user's physical space.

13. The computing device of claim 12, wherein the instructions are further executable to send instructions to at least one of the two or more users to move to a different physical space.

14. The computing device of claim 11, wherein each of the plurality of users are located in different physical spaces, and wherein matching two or more users of the plurality of users further comprises matching two or more users based on a degree of similarity of characteristics of the layout of the physical spaces of the users.

15. The computing device of claim 11, wherein the information regarding characteristics of the layout of the physical space in which each user is located comprises information regarding a size and position of real objects within each user's physical space.

* * * * *